Oct. 11, 1949.   L. K. PERRY   2,484,730
UNIVERSAL FLOAT INCLINOMETER
Filed Aug. 21, 1945   2 Sheets-Sheet 1
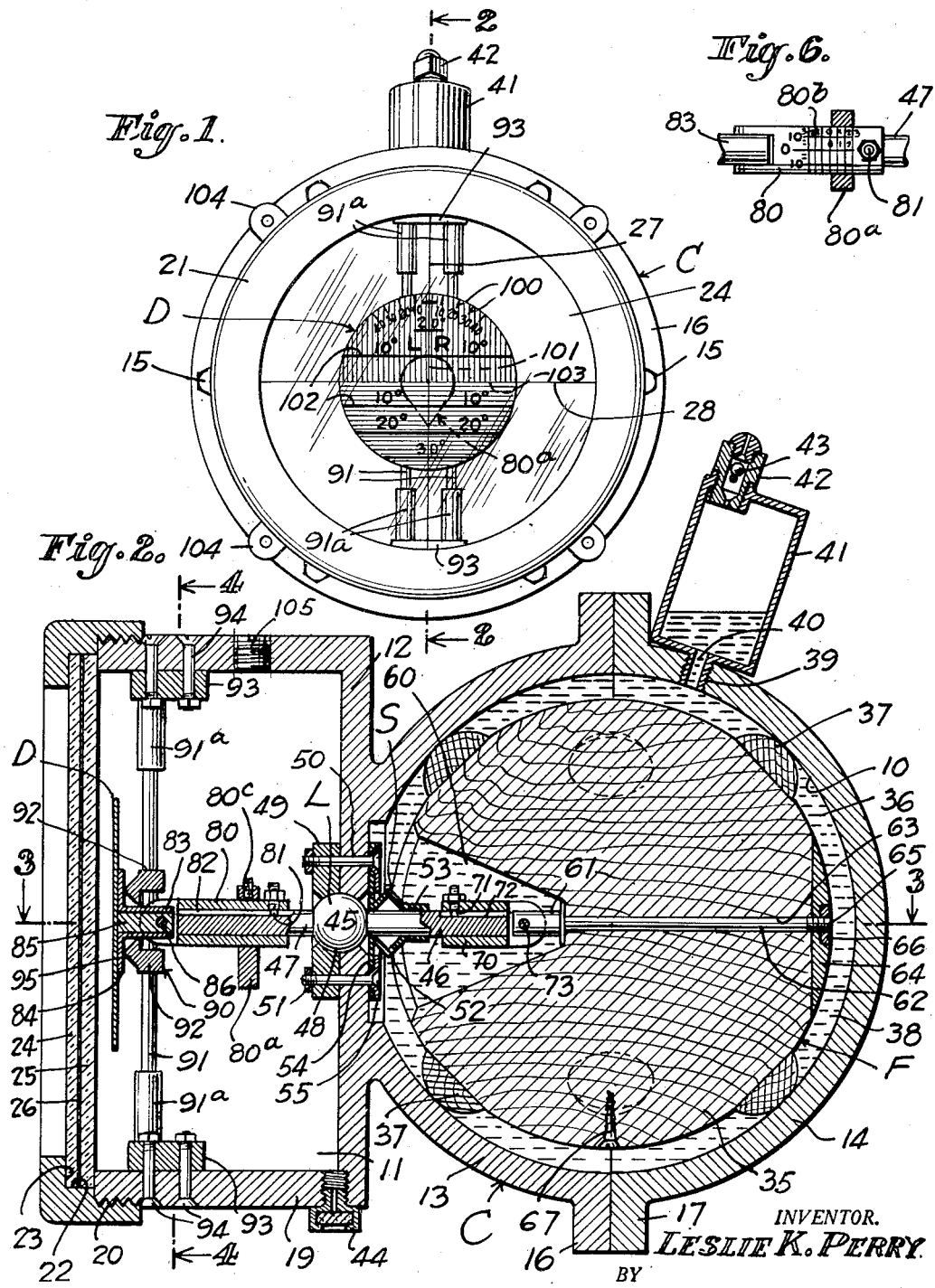
INVENTOR.
LESLIE K. PERRY.
BY Frederick Diehl
ATTORNEY

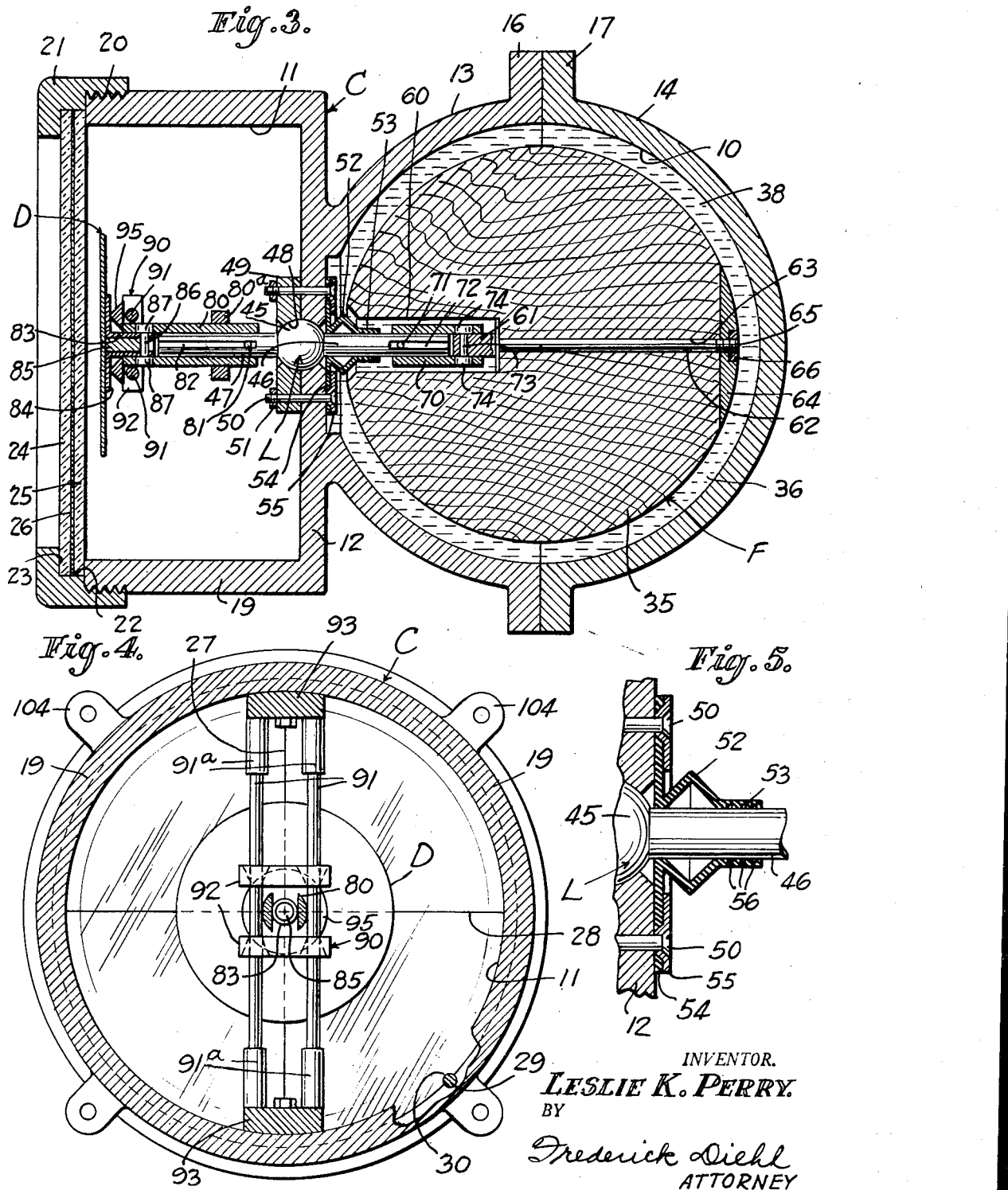

Patented Oct. 11, 1949

2,484,730

UNITED STATES PATENT OFFICE 2,484,730

UNIVERSAL FLOAT INCLINOMETER

Leslie K. Perry, Las Vegas, Nev.

Application August 21, 1945, Serial No. 611,860

9 Claims. (Cl. 33—206)

This invention relates generally to the art of navigation, and more particularly to instruments for indicating fore and aft as well as lateral deviation of a vehicle such as an aircraft, from a level, straight course.

An object of this invention is to provide a navigating instrument of simple, rugged and comparatively inexpensive construction, which is structurally characterized by dependable, positively acting mechanism for accurately indicating climbing and diving movements of an aircraft as well as banking and rolling movements thereof.

A further object of this invention is to provide an automatic horizon instrument of the above described character, particularly adapted, although not necessarily, for use on light aircraft, or for auxiliary equipment to supplement present equipment on large aircraft, which is a self-contained, independent unit requiring no external source of power for its operation such as vacuum or electricity which may fail structurally or be rendered useless in combat.

Still another object of this invention is to provide an automatic horizon instrument which embodies a ball float operating in a liquid-containing chamber with but a negligible frictional contact therebetween, and operatively connected to an indicator for actuation of the latter in accordance with such movements of the aircraft in flight as would tend to rotate the ball float about its center, to the end of indicating to the pilot the exact relation of the aircraft both longitudinally and laterally, to level flight on a straight course.

With these and other objects in view, the invention resides in the combinations, arrangements and functional relationships of elements as set forth in the following specification and particularly pointed out in the appended claims.

In the accompanying drawings,

Figure 1 is a view in front elevation, showing one form of automatic horizon instrument embodying this invention;

Figure 2 is an enlarged vertical sectional view taken on the line 2—2 of Figure 1;

Figure 3 is a horizontal sectional view taken on the line 3—3 of Figure 2;

Figure 4 is a vertical transverse sectional view taken on the line 4—4 of Figure 2;

Figure 5 is an enlarged fragmentary detail sectional view of a fluid seal embodied in the invention; and Figure 6 is a fragmentary detail sectional view illustrating an adjustable balance weight and coacting calibrations for the ball float.

Referring specifically to the drawings, the invention in its illustrated embodiment comprises a case designated generally at C and composed of a float chamber 10 and an indicator chamber 11 separated by a transverse wall or partition 12. The float chamber is spherical and is divided diametrically by two semi-spherical portions 13 and 14 of the case, with the portion 13 projecting from one side of the partition 12. The two portions are secured together by bolts 15 (Figure 1) passing through mating peripheral flanges 16 and 17, to clamp the portions together with a fluid-tight joint therebetween.

The indicator chamber 11 is formed by the wall 12 and by an annular wall 19 externally threaded at 20 to receive a retaining ring 21 in which is fitted against radial and axial shoulders 22 and 23, a transparent face or cover composed of two disks of clear glass 24 and 25 between which is interposed a disk of plastic or "celluloid" 26 having perpendicular and horizontal cross hairs 27 and 28 (Figure 1) extending diametrically in intersecting relation to the periphery of the disk for co-action with a movably mounted dial D controlled by a float F in the chamber 10 in a manner to be later fully described. The disposition of the disks 24, 25 and 26 circumferentially with respect to the case C is fixed by a pin 29 in the wall 19 of the latter entering notches 30 in the disks as shown in Figure 4.

The float F comprises a generally spherical body 35 of balsa or other light wood or fluid-tight hollow sheet metal of an outside diameter somewhat less than the diameter of the chamber to provide a fluid space 36 therebetween. At equally spaced intervals around the body 35 are bearing projections 37 semi-spherical in form and adapted to freely contact the spherical surface of the chamber 10 with minimum friction which is reduced to a negligible quantity by filling all otherwise unoccupied space in the chamber 10 with a liquid 38 such as brake fluid of the types disclosed in U. S. Letters Patent Nos. 1,525,942 and 1,891,962, so that the coefficient of friction between the float and wall of the chamber is practically nil. If constructed of wood, the float F will be coated with a suitable paint to render it fluid-proof and resistant to the deteriorating action of the hydraulic brake fluid.

At substantially its highest point, the chamber 10 is provided with an inlet opening 39 into which is screwed a nipple 40 projecting from the bottom of an expansion chamber 41 to support the latter on the case C as shown in Figure 2. The expansion chamber 41 is provided with a removable filling plug 42 containing a suitable ball check valve 43 which prevents loss of fluid, yet permits circulation of air so as to prevent the building up of pressure in the float chamber. The indicator chamber 11 is provided with a suitable air-filtering vent 44 to compensate for atmospheric pressure variations.

The float F is operatively connected to the dial D by mechanism comprising a motion transferring element in the form of a shaft L adapted to provide a lever of the first class composed of a fulcrum ball 45 and co-axial cylindrical arms 46 and 47, the ball 45 being mounted in a socket bearing 48, one-half of which is formed in the wall 12, and the other half in a plate 49 secured to the wall 12 by bolts 50 having nuts 51, so as to mount the shaft L with its arm 46 projecting into the chamber 10, and its arm 47 projecting into the chamber 11.

A fluid seal S has a bellows portion 52 surrounding the arm 46, and a sleeve portion 53 through which the arm 46 projects. From the bellows portion projects a disk portion 54 with which a clamping disk 55 and the bolts 50 co-act to secure the seal S to the wall 12 with a fluid-tight joint therebetween. The sleeve portion 53 is provided internally with annular grooves 56 (Figure 5) which function to trap liquid on the arm 46 so as to co-act with the bellows portion 52 in preventing any fluid in the chamber 10 reaching the ball and socket fulcrum 45—48 and leaking into the indicator chamber 11.

The float body 35 has a diametric recess 60 therein at one side of its center, which flares radially outward of the body and has disposed therein a head 61 on one end of a bearing rod 62 closely fitting a diametric bore 63 in the body. The other end of the rod 62 extends through an opening in a counterweight 64 and is threaded at 65 to receive a nut 66 to rigidly secure the rod and counterweight in place. At its lowermost point, the body 35 is provided with a screw 67 or other weight to provide ballast.

A connector sleeve 70 is telescopically mounted on the arm 46 and is provided with a key 71 slidably fitting a keyway 72 in the arm to compel the sleeve to rotate with the arm, yet be free to slide axially thereon. One end of the sleeve 70 projects beyond the free end of the arm 46 and is bifurcated to receive the head 61 of the bearing rod 62. A pivot pin 73 mounted in jewel bearings 74 in the connector sleeve 70 (Figure 3) passes through a diametric bore in the head 61 to operatively connect the float F to the shaft L.

A second connector sleeve 80 is telescopically mounted on the arm 47 and is provided with a key 81 slidably fitting a keyway 82 in the arm to compel the sleeve to rotate with the arm, yet be free to slide axially thereon. One end of the sleeve 80 projects beyond the free end of the arm 47 and is bifurcated to receive a bronze journal hub 83 projecting from a bronze bearing plate 84, the hub being mounted on a pin 85 projecting from the back of the dial D. A pivot pin 86 is mounted in jewel bearings 87 (Figure 3) in the connector sleeve 80, and passes through alined bores in the hub 83 and pin 85 to operatively connect the shaft L to the dial D.

A bearing element 90 is mounted for rectilinear movement parallel to the vertical cross hair 27 by two parallel tracks 91 in the form of round rods on which the element 90 is slidable freely by means of the bearings 92 of the element 90, the rods being fixed at their ends in brackets 93 secured to the annular wall 19 of the case C by bolts 94. The element 90 is provided with an annular knife edge contact with the bearing hub 83 and with the bearing plate 84. The sleeve 80 slidably fits between the tracks 91 and abuts the back of the bearing portion 95 of the element 90 as shown in Figure 3 for co-action with the bearing plate 84 in confining the dial D to reciprocating movement parallel to the cross hair 27 and rotational movement about the axis of its pin 85.

The dial D is an aluminum disk and is calibrated to designate turning and banking movements, by a series of radial graduations 100 numbered in degrees for left and right turns designated by characters "L" and "R" respectively, at opposite sides of a perpendicular zero degree index line 101. The dial D is also calibrated to designate climbing and diving movements, by parallel graduations 102 above and below a horizontal zero degree index line 103, all for co-action with the cross hairs 27 and 28 in the operation of the invention which is as follows:

Let it be assumed that the instrument is secured to the instrument panel (not shown) of an aircraft or other vehicle, by utilizing perforate ears 104 on the case C and suitable fastening members (not shown). In its installed position, the instrument is fixed with respect to the vehicle and so that the dial D will give a zero indication when the vehicle is level both longitudinally and transversely, as under such condition the perpendicular and horizontal index lines 101 and 103, respectively, of the dial will be alined with the respective cross hairs 27 and 28 of the case as shown in Figure 1, so that the working parts of the instrument will occupy the positions shown in the drawings.

Should the aircraft assume a climbing or diving angle, the float F will, by virtue of its inertia and its practically frictionless buoyant suspension in the liquid 38 of the float chamber 10, tend to maintain a fixed relation to the earth so that the angular movement of the case C with the aircraft through the climbing or diving angle, will cause the float to effect pivotal movement of the shaft L about the axis of its fulcrum ball 45 by pivotal movement between the float and connector sleeve 70 at the pin 73, in accordance with the angular displacement of the case C relative to the float about the center of the latter.

Through the connector sleeve 80, this motion of the shaft L is transmitted to the dial D by pivotal movement between the latter and shaft at the pin 86, which causes the bearing element 90 to be moved along the tracks 91 and to positively guide the dial vertically and rectilinearly parallel to the plane of the cross hairs 27 and 28. The spacing of the horizontal graduations 102 has been so calculated that they will co-act with the horizontal cross hair 28 to indicate the angle of climb or dive as the case may be.

Similarly, banking movements of the aircraft will react upon the float F to effect rotational movement of the shaft L about the longitudinal axis of its arms 46—47, to correspondingly rotate the dial D about its axis, for co-action of the dial graduations 100 with the perpendicular cross hair 27 in indicating the banking or turning angle whether right or left.

Limited combinations of climbing or diving and banking will thus be caused to be indicated by the co-actions of the graduations 100 and 102 with the respective cross hairs 27 and 28, so that the relation of the aircraft to the horizon will be apparent to the pilot at all times. It will be appreciated that the instrument will function to indicate 360 degrees of rolling movements as well as a substantial amount of climbing or diving movements, and that it will operate with equal efficiency whether inverted or upright.

It will also be noted that suitable buffers 91a of elastic rubber or other resilient material may be mounted on the end portions of the tracks so as to be disposed in the path of movement of the bearing element 90 and thus cushion the shocks of sudden and rapid movements of the aircraft upon the instrument, whereby to prevent damage to the working parts of the instrument.

Furthermore, a suitable balance weight 80a may be slidably and rotatably mounted on the connector sleeve 80 for co-action with calibrations 80b on the sleeve, in adjusting the weight to the exact position necessary to obtain a zero indication on the dial D when the instrument is in a level position. A set screw 80c is provided to secure the weight in adjusted position, and is rendered accessible with a suitable tool (not shown) through an opening in the case C normally closed by a screw plug 105 as shown in Figure 2.

In conclusion, it will be understood that the disclosure of hydraulic fluid as the damping medium for the float F to prevent the float from agitating too freely, is merely illustrative, as such fluid has been chosen because of its freedom from freezing at the low temperatures met with under certain flying conditions.

I claim:

1. In an instrument of the class described, means defining a spherical float chamber containing a liquid and adapted to be fixed to a vehicle; a generally spherical buoyant body freely suspended in said liquid and having peripheral bearing projections providing contact between the wall of the chamber and the body, so as to guide the latter with negligible friction in order that the body will, by its inertia, tend to maintain a fixed relation to the earth; a graduated dial having an axis; means mounting said dial for rotation about its axis and for rectilinear movement transversely of its axis; means co-acting with said dial to indicate said dial movements; a shaft having ball and socket fulcrum intermediate its ends, by which the shaft is movably mounted from the first means; an extensible, pivotal connection between the shaft at one side of its fulcrum and the body at a location offset from its center; and an extensible, pivotal connection between the shaft at the other side of its fulcrum, and the dial, by which the latter will be rotated and/or transversely moved in accordance with the movements imparted to the shaft by movements of the first means relative to the body.

2. In an instrument of the class described, means defining a spherical float chamber containing a liquid and adapted to be fixed to a vehicle; a generally spherical buoyant body freely suspended in said liquid and having peripheral bearing projections providing contact between the wall of the chamber and the body, so as to guide the latter with negligible friction in order that the body will, by its inertia, tend to maintain a fixed relation to the earth; a graduated dial having an axis; means mounting said dial for rotation about its axis and for rectilinear movement transversely of its axis; means co-acting with said dial to indicate said dial movements; a shaft having a ball and socket fulcrum intermediate its ends, by which the shaft is movably mounted from the first means; connectors mounted on the shaft at opposite sides of its fulcrum and being keyed to the shaft for rotation therewith, yet free to move axially relative to the shaft; means pivotally connecting one of said connectors to said body about an axis offset from the center of the body; and means pivotally connecting the other of said connectors to said dial to rotate and/or transversely move same in accordance with movements imparted to the shaft by movements of the first means relative to the body.

3. In an instrument of the class described, means defining a spherical float chamber containing a liquid and adapted to be fixed to a vehicle; a generally spherical buoyant body freely suspended in said liquid and having peripheral bearing projections providing contact between the wall of the chamber and the body, so as to guide the latter with negligible friction in order that the body will, by its inertia, tend to maintain a fixed relation to the earth; a graduated dial having a journal hub; a bearing element receiving said hub; tracks on which said bearing element is mounted to guide the dial for rectilinear movement transversely of its axis, yet permit rotation of the dial about its axis; means co-acting with said dial to indicate the magnitude of the dial movements; a shaft having a ball and socket fulcrum intermediate its ends by which the shaft is movably mounted from the first means; a sleeve connector telescopically mounted on the shaft at one side of said fulcrum and splined to the shaft; means pivotally connecting said connector to said body about an axis offset from the center of the body; a second sleeve connector telescopically mounted on the shaft at the other side of said fulcrum and splined to the shaft; and means pivotally connecting said second connector to said dial hub so as to effect rotary and/or transverse movements of the dial in accordance with movements imparted to the shaft by movements of the first means relative to said body.

4. In an instrument of the class described, two means adapted to respectively represent the horizon and a perpendicular thereto; a dial having graduations; means rotatably mounting said dial about its axis for co-action with said perpendicular one of said two means in indicating turning and banking movements; means mounting said dial for movement transversely of its axis, for co-action with the horizon-representing means in indicating climbing and diving movements; means defining a spherical float chamber containing a liquid; a float in said chamber having portions contacting the chamber wall with negligible friction so that the float will, by its inertia, tend to maintain a fixed relation to the earth; and means operatively connecting the float to said dial to actuate the latter rotationally or transversely according as movement of the chamber tends to rotate the float about one axis, or about a second axis perpendicular to said one axis.

5. In an instrument of the class described, two means adapted to respectively represent the horizon and a perpendicular thereto; a dial having graduations; means rotatably mounting said dial about its axis for co-action with said perpendicular one of said two means in indicating turning and banking movements; means mounting said dial for movement transversely of its axis, for co-action with the horizon-representing means in indicating climbing and diving movements; means defining a spherical float chamber containing a liquid; a float in said chamber having portions contacting the chamber wall with negligible friction so that the float will, by its inertia, tend to maintain a fixed relation to the earth; and means operatively connecting the float to said dial to actuate the latter rotationally or transversely according as movement of the chamber tends to rotate the float about one axis, or about a second axis perpendicular to said one axis; said float having ballast to maintain it steady when subjected to a rotating force by movement of the chamber; and a counterweight carried by the float in a position to counterbalance any unbalancing weight of the dial and associated parts imposed on the float.

6. In an instrument of the class described, a case having a wall dividing it into an indicator chamber having horizontal and perpendicular cross hairs, and a float chamber containing a quantity of liquid; a float in said liquid contacting the chamber wall with negligible friction so as to tend to maintain, by its inertia, a fixed relation to the earth; a shaft having a ball and socket fulcrum in said wall and projecting from opposite sides thereof into said chambers; a graduated dial; means mounting said dial in the indicator chamber for rotation to co-act with the perpendicular cross hair; means mounting the dial for vertical movement transversely of its axis for co-action with said horizontal cross hair; said float having a recess into which said shaft projects; means pivotally connecting said shaft in said recess to the float at a location offset from the center of the float; and means pivotally connecting said shaft to said dial, to transmit to the latter, movements imparted to the shaft in response to such movements of the case as rotatably react upon the float.

7. In an instrument of the class described, a case having a wall dividing it into an indicator chamber having horizontal and perpendicular cross hairs, and a float chamber containing a quantity of liquid; a float in said liquid contacting the chamber wall with negligible friction so as to tend to maintain, by its inertia, a fixed relation to the earth; a shaft having a ball and socket fulcrum in said wall and projecting from opposite sides thereof into said chambers; a graduated dial having a journal hub; a bearing element in which said hub is rotatably mounted for co-action of the dial with the perpendicular cross hair; tracks on which said element is mounted to mount the dial for vertical movement transversely of its axis for co-action with said horizontal cross hair; means operatively connecting the shaft to the float; and means operatively connecting the shaft to said dial hub to transmit to the dial, movements imparted to the shaft in response to such movements of the case as rotatably react upon the float.

8. In an instrument of the class described, a case having a wall dividing it into an indicator chamber having horizontal and perpendicular cross hairs, and a float chamber containing a quantity of liquid; a float in said liquid contacting the chamber wall with negligible friction so as to tend to maintain, by its inertia, a fixed relation to the earth; a shaft having a ball and socket fulcrum in said wall and projecting from opposite sides thereof into said chambers; a graduated dial having a journal hub; a bearing element in which said hub is rotatably mounted for co-action of the dial with the perpendicular cross hair; tracks on which said element is mounted to mount the dial for vertical movement transversely of its axis for co-action with said horizontal cross hair; said float having a recess into which one end of said shaft projects; connector sleeves telescopically mounted on the end portions of said shaft and having splined connections therewith; means pivotally connecting one connector sleeve to the float at a location offset from the float center; and means pivotally connecting the other connector sleeve to the dial hub so as to transmit to the dial, movements imparted to the shaft in response to such movements of the case as to react rotationally upon the float.

9. In an instrument of the class described, a graduated dial having a journal hub; a bearing member having spaced bearings and an annular knife edge bearing in which said hub is mounted to support the dial for rotation; tracks on which said bearing member is mounted to support the dial for rectilinear movement transversely of the dial axis; a fixed support having cross hairs disposed in front of said dial for co-action with the dial graduations in giving indications of the aforesaid movements of the dial; and means operatively connected to said hub, for actuating the dial.

LESLIE K. PERRY.

REFERENCES CITED

The following references are of record in the file of this patent:

UNITED STATES PATENTS

| Number | Name | Date |
|---|---|---|
| 1,552,691 | Girvin | Sept. 8, 1925 |
| 1,827,560 | Binckley | Oct. 13, 1931 |
| 1,985,659 | Hickstein | Dec. 25, 1934 |
| 2,192,148 | Otto | Feb. 27, 1940 |
| 2,320,505 | Bendar | June 1, 1943 |
| 2,352,758 | Bauknecht | July 4, 1944 |

FOREIGN PATENTS

| Number | Country | Date |
|---|---|---|
| 10,819 | Great Britain | 1904 |
| 311,426 | Germany | Feb. 23, 1918 |
| 317,923 | Germany | 1919 |